(12) United States Patent
Xiong et al.

(10) Patent No.: US 10,529,323 B2
(45) Date of Patent: Jan. 7, 2020

(54) SEMANTIC PROCESSING METHOD OF ROBOT AND SEMANTIC PROCESSING DEVICE

(71) Applicant: UBTECH Robotics Corp, Shenzhen (CN)

(72) Inventors: Youjun Xiong, Shenzhen (CN); Lin Chen, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 210 days.

(21) Appl. No.: 15/712,072

(22) Filed: Sep. 21, 2017

(65) Prior Publication Data

US 2018/0336890 A1 Nov. 22, 2018

(30) Foreign Application Priority Data

May 19, 2017 (CN) .......................... 2017 1 0358868
May 19, 2017 (CN) .......................... 2017 1 0361264

(51) Int. Cl.
*G10L 15/18* (2013.01)
*G10L 15/22* (2006.01)
*G06F 16/242* (2019.01)
*G06F 17/27* (2006.01)

(52) U.S. Cl.
CPC ........ *G10L 15/1815* (2013.01); *G06F 16/243* (2019.01); *G06F 17/2785* (2013.01); *G10L 15/22* (2013.01); *G10L 2015/223* (2013.01)

(58) Field of Classification Search
CPC .... G06F 16/243; G06F 17/2785; G06F 3/167; G10L 15/1815; G10L 15/22; G10L 2015/223
See application file for complete search history.

(56) References Cited

U.S. PATENT DOCUMENTS

| | | | | |
|---|---|---|---|---|
| 2012/0016678 | A1* | 1/2012 | Gruber | G10L 15/22 704/275 |
| 2012/0185484 | A1* | 7/2012 | Jones | G06Q 10/101 707/740 |
| 2015/0030143 | A1* | 1/2015 | Bhogal | H04M 3/5166 379/88.18 |
| 2015/0279366 | A1* | 10/2015 | Krestnikov | H04W 4/70 704/235 |
| 2016/0379121 | A1* | 12/2016 | Ge | B25J 11/0005 706/46 |
| 2018/0211287 | A1* | 7/2018 | Byron | G06N 20/00 |
| 2019/0171713 | A1* | 6/2019 | Zang | G06F 16/00 |

* cited by examiner

*Primary Examiner* — Ryan Rink (57) ABSTRACT

The present disclosure relates to a semantic processing method of robots, including: receiving, by a semantic processing platform, a voice request from a robot, performing a sematic analysis on the voice request to obtain a current sematic intention, determining whether a response matching the current semantic intention is stored in a database, obtaining the response from the database if determining that the response is stored in the database, obtaining the response by accessing a third-party application corresponding to the current semantic intention if determining that the response is not stored in the database, and transmitting the response to the robot to guide the robot to perform a corresponding action. The present disclosure further provides a semantic processing device.

14 Claims, 3 Drawing Sheets

SEMANTIC PROCESSING METHOD OF ROBOT AND SEMANTIC PROCESSING DEVICE

CROSS REFERENCE TO RELATED APPLICATIONS

This application claims priority to Chinese Patent Application Nos. 201710361264.3 and 201710358868.2, both filed on May 19, 2017, which are hereby incorporated by reference herein in their entirety.

BACKGROUND

1. Technical Field

The present disclosure relates to robot field, and particularly to a semantic processing method of robots and a semantic processing device.

2. Description of Related Art

With the evolution of technology, robots may not only be adopted in the operations that humans may not be able to complete, such as airspace and anti-terrorism detection operations, but also may be adopted in the daily life, such as guiding people in train stations and shopping mall or doing housework at home.

Currently, the robot may perform voice interpretation and obtain the corresponding response. However, the robots may need to have a powerful local data storage system, and different environments may correspond to different data systems, accordingly the robots might be clumsy and might not be flexibly adopted in a variety of scenarios.

With the evolution of computer science, human society has entered a highly automatic and highly informative era. The computer science accelerates the evolution of human society. The progress of human society, however, brings higher demand and challenge of the computer science. As such, a voice controlling robot is urgently demanded.

Semantic processing plays an important role in Human-computer interaction and communication between human. However, the same function may correspond to a plurality of voice requests, and the database within the robot may include a great amount of voice information, which may reduce processing speed of the robot.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments. It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The present disclosure relates a semantic processing platform of robots, wherein the semantic processing platform is configured to receive a voice request transmitted from the robots, perform a semantic analysis on the voice request, obtain the corresponding response, and transmit the corresponding response to the robots. As such, the loadings of the robots may be reduced and the robots may obtain the response within a variety of scenarios via the semantic processing platform. Thus, the applications of the robots may be further expanded without changing software of the robots, and the robots may be further adopted in different scenarios.

Figure 1:
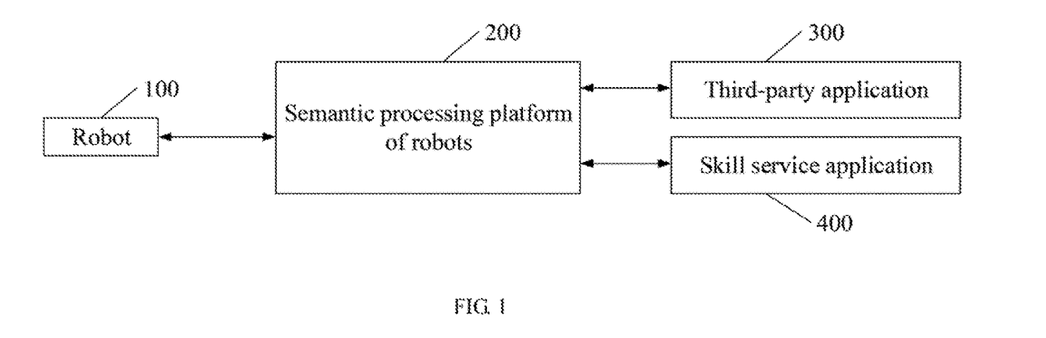
FIG. 1 is a schematic view of a semantic processing platform in accordance of one embodiment of the present disclosure.

As shown in FIG. 1, the present disclosure relates to a semantic processing system including at least one robot 100, a semantic processing platform 200, at least one third-party application 300, and at least one skill service application 400. In an example, the semantic processing platform 200, the at least one third-party application 300, and the at least one skill service application 400 may be configured within a server.

The robot 100 may communicate with the semantic processing platform 200. For example, the robot 100 may transmit the voice request to the semantic processing platform 200, and the semantic processing platform 200 may transmit the response to the robot 100.

The third-party applications 300 may be a Natural Language Processing (NLP) device. In an example, the NLP device may include weather forecast applications, music video applications, and news applications. The third-party applications are configured with open interfaces configured to connect the semantic processing platform 200 with the third-party applications 300. The semantic processing platform 200 may access the third-party application 300 via the open interface, i.e., the semantic processing platform 200 may obtain the response from the third-party applications 300. The information obtained from the third-party application may be stored in the semantic processing platform 200.

In an example, the skill service applications 400 may include photo applications, calling applications, dancing applications, and so on. Each of the applications may correspond to at least one action, and the semantic processing platform 200 may connect with the skill service application via a connecting interface.

The semantic processing platform 200 may include at least one service triggering interface configured to access the skill service applications. Thus, semantic intention corresponding to the skill service application 400 is bonded with the service triggering interface. That is, the skill service application may be registered to the semantic processing platform 200 and the semantic processing platform 200 may bond the semantic intention corresponding to the skill service application with the service triggering interface. Such that, the semantic processing platform 200 may access the skill service applications 400 according to the bonding relation between the semantic intention and the service triggering interface. According to the bonding relation the robot may be guided to perform the corresponding action. For example, the semantic processing platform 200 bonds the semantic intention with a representational state transfer (REST) interface of the hypertext transfer protocol (HTTP). As such, the robot platform 200 may connect with the third-party applications 300 via the REST interface.

The semantic processing system may be configured in a different manner according to different scenarios or requirements. The semantic processing system may only include the robot and the semantic processing platform, or may further include the third-party application and one or two skill service applications.

Wherein the semantic processing platform 200 may further include a database stored in the server and including a variety of responses corresponding to the different semantic intentions.

The skill service application 400 may be directly registered to the semantic processing platform 200 or may be registered to a specific module collaborated with the semantic processing platform 200. As such, the specific module may conduct a registration process on the skill service applications and may manage the skill service applications. The semantic intention corresponding to the skill service application may be bonded with the service triggering interface of the semantic processing platform 200, and the bonding relation may be transmitted to the semantic processing platform and may be stored in the database of the semantic processing platform 200.

The semantic processing platform may perform a semantic process basing on the semantic processing system.

Figure 2:
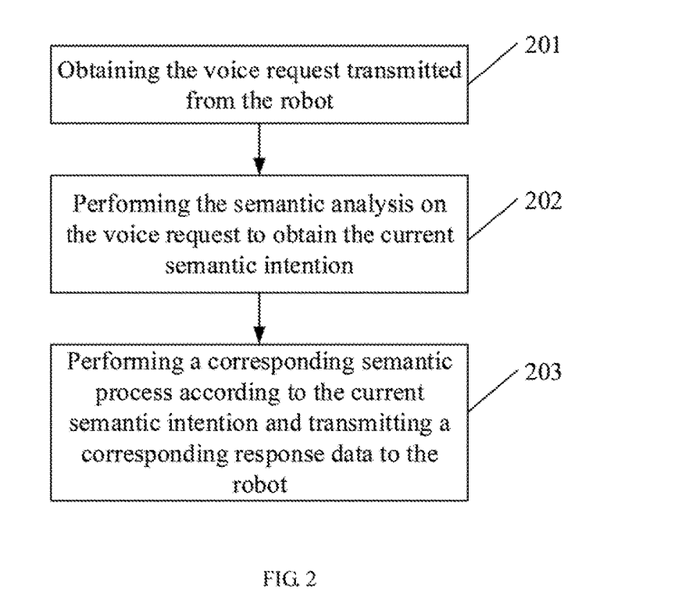
FIG. 2 is a flowchart of a semantic processing method in accordance of one embodiment of the present disclosure.

As shown in FIG. 2, the present disclosure relates to a semantic processing method of robots including following steps.

In step 201: obtaining the voice request transmitted from the robot.

The robot 100 may communicate with the semantic processing platform 200.

That is, the robot 100 may transmit the voice request to the semantic processing platform 200, and the semantic processing platform 200 may obtain the voice request transmitted from the robot 100.

In step 202: performing the semantic analysis on the voice request to obtain the current semantic intention.

The semantic intentions may be defined and classified by performing a semantic analysis process by a Natural Language Understanding (NLU) device, and the semantic intention may be stored in the database. For example, the semantic intentions may include conversation intention, function intention, and skill service intention. As such, after the semantic analysis process has been performed on the voice request by the NLU device, corresponding text information may be obtained. The current semantic intention may be obtained by comparing each definition of the semantic intentions stored in the database, adopting a processing method of calculating the similarity the text information, and calculating the proportion of the same words to determine the similarity of the text.

For example, if the voice request is "What's your name? What's your type?", the current semantic intention may be configured to be the conversation intention by performing the semantic analysis by the NLU device. If the voice request is "What's the weather today?", the current semantic intention may be configured to be the function intention by performing the semantic analysis by the NLU device, If the voice request is "Dance, please!", the current semantic intention may be configured to be the skill service intention by performing the semantic analysis by the NLU device.

In step 203: performing a corresponding semantic process according to the current semantic intention and transmitting a corresponding response to the robot.

The semantic processing platform may include the database configured to store the response corresponding to a variety of the current semantic intentions. Thus, it can be determined whether the response matching the current semantic intention has been stored in the database. If the response matching the current semantic intention has been stored in the database, the semantic processing platform may obtain the corresponding response from the database and may transmit the response to the robot. If the response matching the current semantic intention has not been stored in the database, the semantic processing platform may access a service application corresponding to the current semantic intention to obtain the response. Wherein the semantic processing platform may connect with at least one of the third-party application and the skill service application, and the third-party application and the skill service application may be configured to be the service application.

For example, if the current semantic intention is the conversation intention like "What's your name? What's your type?", and the matching response has been stored in the database, such as "I am Helen, L1 type". In another example, the response matching the current semantic intention may be obtained by adopting the processing method of calculating text similarity.

If the current semantic intention is the semantic intention corresponds to "What's the weather today?", which is configured to be the function intention. It can be determined whether the response matching the current semantic intention has been stored in the database. If the response matching the current semantic intention has been stored in the database, the semantic processing platform may obtain the response from the database. For example, the response may be the information, such as "Today is a sunny day, and the temperature is 27 Celsius degrees". If the response matching the current semantic intention has not been stored in the database, the response may be obtained by accessing to the service application corresponding to the current semantic intention.

The semantic intentions may include a variety of types, and correspond to different service applications. If the current semantic intention is the function intention, the response may be obtained from the corresponding third-party application. If the current semantic intention is the skill service intention, the semantic instruction may be obtained from the corresponding registered skill service application, and the semantic processing platform may transmit the corresponding semantic instruction to the robot to guide the robot to perform a corresponding voice operation, and the semantic process may continue until the robot is guided to perform the corresponding action.

The third-party application is configured with the open interface, and the semantic processing platform may obtain the response from the third-party application via the open interface. Thus, when the current semantic intention is the function intention, the corresponding response may be obtained from the corresponding third-party application. For example, if the current semantic intention is the semantic intention corresponds to "What's the weather today?", which is configured to be the function intention, the response may be obtained from the third-party weather forecast application. The response may include the information, such as "Today is a sunny day, and the temperature is 27 Celsius degrees".

The skill service application has to be registered to the semantic processing platform in advance. Each of the skill service applications may correspond to one action. After the skill service application being register to the semantic processing platform, the semantic intention corresponding to the skill service application may be bonded with the service triggering interface. As such, the skill service application may be registered to the semantic processing platform, and the bonding relation may be stored in the database of the semantic processing platform. Therefore, if the current semantic intention is the skill service intention, the service triggering interface corresponding to the current semantic intention may be determined according to the bonding relation between the semantic intention and the service triggering interface. Such that, the corresponding current skill service application may be determined via the current service triggering interface, and the voice instruction may be obtained. The semantic processing platform may transmit the voice instruction to the robot to guide the robot to perform the corresponding voice operation, and the semantic process may continue until the robot is guided to perform the corresponding action.

For example, the current semantic intention relates to the skill service intention, such as "Dance, please!", and the corresponding dancing application have been registered to the semantic processing platform and the service triggering interface have been bonded with the dancing application. So that, the registered dancing application may be determined via a dancing service triggering interface, and the semantic processing platform may obtain a "Starting" instruction transmitted from the dancing application. The semantic processing platform may transmit the "Starting" instruction to the robot to guide the robot to transmit a "Starting" voice request. As such, the semantic processing platform may continue the semantic process by receiving the "Starting" voice request, including: determining the dancing application, obtaining the response, such as dance action information, transmitted from the dancing application, transmitting the response to the robot to drive the robot to perform a dance action.

The process of obtaining the response via the service application corresponding to the current semantic intention may not be limited to this. The third-party application may be accessed via the open interface, and thus the information obtaining from the third-party application may be stored in the database of the semantic processing platform. As such, it can be determined whether the information obtained from the third-party application corresponding to the current semantic intention has been stored in the database. If the information of the third-party application has been stored in the database, the corresponding response may be obtained from the database. If the information of the third-party application corresponding to the current semantic intention has not been stored in the database, the corresponding response may be obtained from the determined registered service application corresponding to the current semantic intention. The semantic processing platform may transmit the corresponding response to the robot to guide the robot to perform the corresponding voice operation, and the semantic process may continue until the robot is guided to perform the corresponding action.

The semantic processing platform may further include the specific module configured to conduct the registration process on the skill service applications and to manage the skill service application. As such, the specific module may bond the semantic intention corresponding to the skill service application with the service triggering interface, and may transmit the bonding relation to the semantic processing platform. And thus, the bonding relation between the semantic intention and the service triggering interface may be stored in the database of the semantic processing platform. So that, if the current semantic intention is the skill service intention, the service triggering interface corresponding to the current semantic intention may be determined via the bonding relation between the semantic intention and the service triggering interface. Such that, the corresponding current skill service application may be determined via the current service triggering interface, and the voice instruction may be obtained. The semantic processing platform may transmit the voice instruction to the robot to guide the robot to perform the corresponding voice operation, and the semantic process may continue until the robot is guided to perform the corresponding action.

In view of the above, the semantic processing platform of robots may receive the voice request transmitted from the robots, perform the voice analysis on the voice request, obtain the corresponding response, and return the corresponding response to the robots. As such, the loadings of the robots may be reduced and the robots may obtain the response within a variety of scenarios via the semantic processing platform. And thus, the applications of the robots may be further expanded without changing software of the robots, and the robots may be further adopted in different scenarios.

In one example, after the semantic processing platform obtains the response, the response may be stored in the database of the semantic processing platform. As such, the response may be obtained directly from the database when conducting the semantic process next time, so as to simplify the process and to improve the semantic processing speed. For example, if the current semantic intention is the function intention corresponds to "What's the weather on Mar. 3, 2004?" The response may be obtained from the corresponding weather forecast application, and the response corresponding to the current semantic intention may be stored in the database. As such, corresponding response may be directly obtained from the database when the user asks the same voice request "What's the weather on Mar. 3, 2004?" next time, and the third-party application may not be adopted, so as to improve the semantic processing speed.

Figure 3:
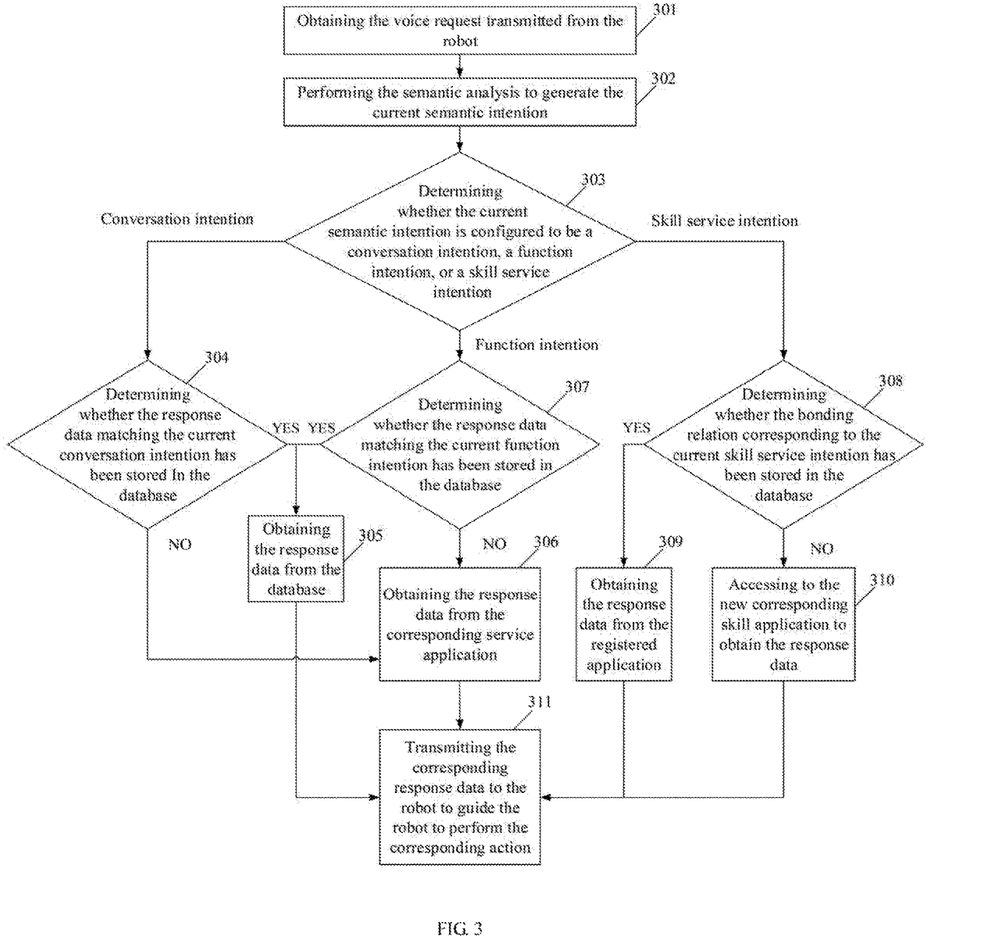
FIG. 3 is a flowchart of a semantic processing method in accordance of another embodiment of the present disclosure.

In another aspect, as shown in FIG. 3, the present disclosure further relates to the semantic processing method of robots including the following steps.

In step 301: obtaining the voice request transmitted from the robot.

The robot may be woken up and may receive the voice request transmitted from the users. The robot may transmit the voice request including an identification (ID) of the robot to the semantic processing platform. Wherein the voice request may be such as "What's the weather today?" or "I want to take a photo".

In step 302: performing the semantic analysis to generate the current semantic intention.

In one example, the voice request is transmitted to a NLU device to perform the semantic analysis, so as to generate the current semantic intention. In another example, the processing method of calculating text similarity is adopted, and the proportion of the same words is calculated to determine the similarity of the text, such that the current semantic intention may be obtained.

In step 303: determining whether the current semantic intention is configured to be a conversation intention, a function intention, or a skill service intention.

If the current semantic intention is configured to be the conversation intention, the process goes to step 304. If the current semantic intention is configured to be the function intention, the process goes to step 307. If the current semantic intention is configured to be the skill service intention, the process goes to step 308.

For example, if the voice request is "What's your name?", the current semantic intention may be configured to be the conversation intention. If the voice request is "What's the weather today?", the semantic intention is configured to be the function intention. If the voice request is "I want to take a photo", the semantic intention is configured to be the skill service intention.

In step 304: determining whether the response matching the current conversation intention has been stored in the database.

In one example, if the response matching the voice request "What's your name?", which is configured to be the conversation intention, has been stored in the database, the process goes to step 305. If the response corresponding to the voice request "What's your name?" has not been stored in the database, the process goes to step 306.

In step 305: obtaining the response from the database.

If the response matching the current semantic intention is determined to be stored in the database, the response may be obtained directly from the database, and the process goes to step 312.

In step 306: obtaining the response from the corresponding third-party application.

In step 307: determining whether the response matching the current function intention has been stored in the database.

If the response matching the current function intention has been stored in the database, the process goes to step 305. If the response matching the current function intention has not been stored in the database, the process goes to step 306.

The third-party application may be configured to be a Natural Language Processing (NLP) device and is configured with the open interface. Thus, the current connecting interface of the third-party application may be directly determined according to the current semantic intention. The response corresponding to the current semantic intention may be obtained from the third-party application via the current connecting interface. The response matching the current function intention may be updated to the database, as such, the corresponding response may be directly obtained from the database when other user asks the same voice request.

In step 308: determining whether the bonding relation corresponding to the current skill service intention has been stored in the database.

If the bonding relation corresponding to the current skill service intention has been stored in the database, the process goes to step 309. If the response matching the current skill service intention has not been stored in the database, the process goes to step 310.

In one example, if the current voice request is "I want to take a photo", which is configured to be the skill service intention, the semantic processing platform may determine whether the bonding relation between the semantic intention and the skill service application has been stored in the database.

In step 309: obtaining the response from the registered application.

The specific module may conduct the registration process on the skill application, may bond the semantic intention corresponding to the skill service application with the service triggering interface, and may transmit the bonding relation to the semantic processing platform. And thus, the bonding relation between the semantic intention and the service triggering interface may be stored in the database of the semantic processing platform. So that, if the current semantic intention is the skill service intention, the service triggering interface corresponding to the current semantic intention may be determined according to the bonding relation between the semantic intention and the service triggering interface. Such that, the corresponding current skill service application may be accessed via the current service triggering interface, and the response corresponding to the current semantic intention may be obtained.

In step 310: accessing to the corresponding skill application to obtain the response.

If the bonding relation corresponding to the current semantic intention, the specific module may conduct the registration process on a new skill application corresponding to the current skill service intention, may bond the semantic intention corresponding to the skill service application with the service triggering interface, so that, the corresponding response may be obtained from the new skill application, and the bonding relation may be updated to the database.

In step: 311: transmitting the corresponding response to the robot to guide the robot to perform the corresponding action.

In one example, the response transmitted to the robot may be, such as, the weather information on Mar. 3, 2004. The robot may receive the response, may synthesize voice information, and play the synthesized voice information.

In another example, if the response is obtained from the NIP device, the response may be transmitted directly to the robot according to the ID of the robot.

In another example, if the voice request is "I want to take a photo", the response obtaining from the corresponding skill service application may be, such as, the voice instruction, so as to guide the user to ask the robot to take the photo.

In view of the above, the semantic processing platform of robots may receive the voice request transmitted from the robots, perform the voice analysis on the voice request, obtain the corresponding response, and return the corresponding response to the robots. The robot may be guided to complete the setting of skill service by processing two or more times of the semantic interaction process. As such, the loadings of the robots may be reduced and the robots may obtain the response within a variety of scenarios via the semantic processing platform. And thus, the applications of the robots may be further expanded without changing software of the robots, and the robots may be further adopted in different scenarios.

Figure 4:
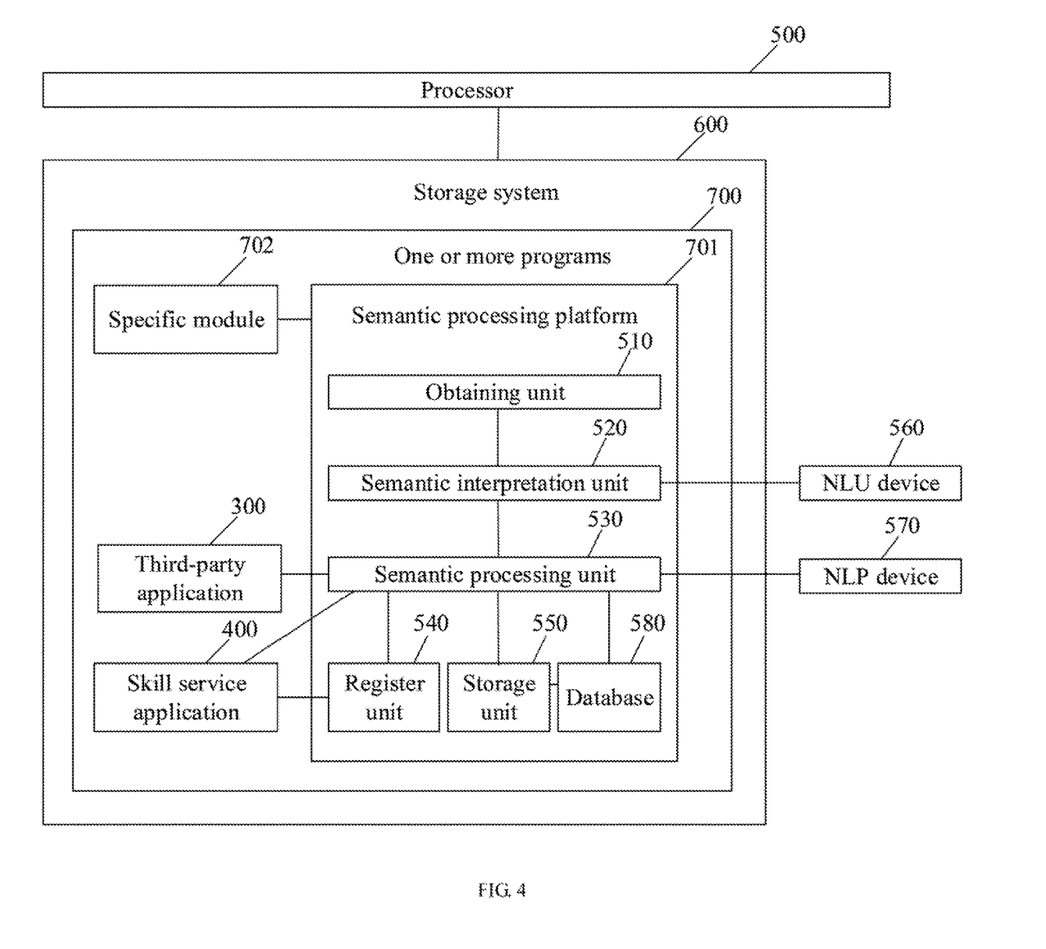
FIG. 4 is a schematic view of a semantic processing device in accordance of one embodiment of the present disclosure.

In one aspect, the present disclosure further relates to a semantic processing device, as shown in FIG. 4, including: a processor 500, a storage system 600, and one or more programs 700 that are stored in the storage system 600 and are executed by the processor 500. The one or more programs 700 includes: a semantic processing platform 701, a specific module 702, at least one third-party application 300, and at least one skill service application 400. The semantic processing platform 701 includes: an obtaining unit 510, a semantic interpretation unit 520, a semantic processing unit 530, a register unit 540, a storage unit 550, and a database 580.

The obtaining unit 510 is configured to obtain the voice request transmitted from the robot.

The semantic interpretation unit 520 may connect with the NLU device 560, and the semantic interpretation unit 520 is configured to perform the semantic analysis on the voice request to obtain the current semantic intention via the NLU device 560.

The semantic processing unit 530 is configured to conduct the corresponding semantic process according to the current semantic intention and to transmit the response to the robot.

In one example, the semantic processing unit 530 may be further configured to obtain the response from the database 580 when the response matching the current semantic intention, or to obtain the corresponding response via the service application corresponding to the current semantic intention when the response matching the current semantic intention has not been stored in the database 580.

In another example, the semantic processing unit 530 may be configured to obtain the corresponding response via the corresponding NLP device 570 when the response matching the current semantic intention has not been stored in the database 580. The semantic processing unit 530 may be further configured to determine the registered skill service application 400 corresponding to the current semantic intention, obtain the corresponding voice instruction, transmit the corresponding voice instruction to the robot to guide the robot to perform the corresponding voice operation, and the semantic process may continue until the robot is guided to perform the corresponding action. Or if the response matching the current semantic intention has been stored in the database 580, the semantic processing unit 530 is configured to obtain the response from the database 580. If the response matching the current semantic intention has not been stored in the database 580, the semantic processing unit 530 is configured to access the registered service application corresponding to the current semantic intention to obtain the corresponding voice instruction, transmit the corresponding voice instruction to the robot to guide the robot to perform the corresponding voice operation, and the semantic process may continue until the robot is guided to perform the corresponding action.

The semantic processing device may further include the register unit 540 configured to conduct the registration process on the skill service application 400 and to bond the semantic intention corresponding to the skill service application 400 with the service triggering interface. For example, the register unit 540 may conduct the register process on the dancing application and the photograph application. The register unit 540 may bond the semantic intention "Dance" with the dance service triggering interface and may bond the semantic intention "Photograph" with the photograph service triggering interface.

With respect to the robot including the specific module 702, the register unit 540 may be configured in the collaboration.

The semantic processing device may further include a storage unit 550 configured to store the response to the database 580.

For example, the obtaining unit 510 may obtain the voice request transmitted from the robot. The semantic interpretation unit 520 is configured to perform the semantic analysis on the voice request to obtain the current semantic intention. The semantic processing unit 530 may determine whether the response matching the current semantic intention has been stored in the database 580. If the response matching the current semantic intention has been stored in the database 580, the corresponding response may be obtained from the database 580. For example, the current semantic intention may be, such as "Name and type", and the response matching the current semantic intention exists in the database 580 may be, such as "Name is Chang and type is E1". Such that, the semantic processing unit 530 may obtain the response, such as "Name is Chang and type is E1" from the database 580 and may transmit the response to the robot.

If the current semantic intention is "The song named **\*\*", and the response matching the current semantic intention has not been stored in the database 580, the semantic processing unit 530 may obtain the response by accessing the service application corresponding to the current semantic intention. The current semantic intention is the function intention, and thus the semantic processing unit 530 may obtain the response from the corresponding music application. For example, the semantic processing unit 530 may obtain a music document named "\*\*", and the semantic processing unit 530** may transmit the response to the robot.

After the semantic processing unit 530 obtains the corresponding response, the storage unit 550 may store the response obtained from the database 580. As such, when the user asks the voice request "the song named **\*\*" again, the corresponding music document named "\*\*" may be obtained directly from the database 580**.

In one example, if the current semantic intention is "Samba dance!", wherein the current semantic intention is configured to be the skill service intention, and the response matching the current semantic intention has not been stored in the database 580. The semantic processing unit 530 may obtain the response from the registered dance service application, wherein the registered dance service application is determined according to the bonding relation between the semantic intention and the service triggering interface in the register unit 540. The semantic processing unit 530 may transmit the semantic instruction to the robot to guide the user to ask the voice request, such as, "Start dancing!". After the robot transmits the voice request "Start dancing!", the semantic interpretation unit 520 may perform the analysis to obtain the current semantic intention. The current semantic intention is the skill service intention, and the semantic processing unit 530 may choose the registered dancing service application, so as to obtain the document including the samba action information. The document may be transmitted to the robot to guide the robot to complete the dancing action.

In another example, if the current semantic intention includes "Samba dance!", wherein the response matching the current semantic intention has not been stored in the database 580, and the response obtained from the third-party application 300 corresponding to the current semantic intention has not been stored in the database 580. The semantic processing unit 530 may obtain the semantic instruction from the registered dance service application, wherein the registered dance service application is determined according to the bonding relation between the semantic intention and the service triggering interface in the register unit 540. The semantic processing unit 530 may transmit the semantic instruction to the robot to guide the robot to perform the corresponding voice operation. The semantic process may continue until the robot is guided to perform the corresponding action.

In view of the above, the semantic processing platform of robots may receive the voice request transmitted from the robots, perform the voice analysis on the voice request, obtain the corresponding response, and return the corresponding response to the robots. As such, the loadings of the robots may be reduced and the robots may obtain the response within a variety of scenarios via the semantic processing platform. And thus, the applications of the robots may be further expanded without changing software of the robots, and the robots may be further adopted in different scenarios.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A semantic processing method comprising:
receiving, by a semantic processing platform, a voice request from a robot;
performing, by the semantic processing platform, a sematic analysis on the voice request to obtain a current sematic intention;
determining, by the semantic processing platform, whether a response matching the current semantic intention is stored in a database, wherein the database is configured to store at least one response corresponding to a variety of the current semantic intentions;
obtaining, by the semantic processing platform, the response matching the current semantic intention from the database in response to determining that the response matching the current semantic intention is stored in the database;
obtaining, by the semantic processing platform, the response matching the current semantic intention by accessing a third-party application corresponding to the current semantic intention, in response to determining that the response matching the current semantic intention is not stored in the database, wherein the third-party application is accessed via an open interface of the third-party application; and
transmitting, by the semantic processing platform, the response matching the current semantic intention to the robot to guide the robot to perform a corresponding action.

2. The semantic processing method according to claim 1, wherein before the step of determining, by the semantic processing platform, whether the response matching the current semantic intention is stored in the database in the server, the method further comprises:
determining, by the semantic processing platform, a type of the current semantic intention, wherein the type comprises a conversation intention, a function intention, and a skill service intention.

3. The semantic processing method according to claim 2, wherein in response to the type of the current semantic intention corresponding to the conversation intention or the function intention, after the step of obtaining, by the sematic processing platform, the response matching the current semantic intention by accessing the third-party application corresponding to the current semantic intention, in response to determining that the response matching the current semantic intention is not stored in the database, the method further comprises:
updating, by the semantic processing platform, the response matching the current semantic intention to the database.

4. The semantic processing method according to claim 2, wherein in response to the type of the current semantic intention corresponding to the skill service intention, before the step of transmitting, by the semantic processing platform, the response matching the current semantic intention to the robot to guide the robot to perform a corresponding action, the method further comprises:
determining, by the semantic processing platform, whether a bonding relation corresponding to the current semantic intention is stored in the database;
obtaining, by the semantic processing platform, the response matching the current semantic intention by accessing a skill service application corresponding to the bonding relation via an service triggering interface of the semantic processing platform, in response to determining that the bonding relation corresponding to the current semantic intention is stored in the database, wherein the service triggering interface of the semantic processing platform is bonded with the current semantic intentions; and
accessing, by the semantic processing platform, a new skill application to obtain the response matching the current semantic intention, in response to determining that the bonding relation corresponding to the current semantic intention is not stored in the database.

5. The semantic processing method according to claim 1, wherein
the semantic processing platform transmits the voice request to a natural language understanding (NLU) device, and receives the current semantic intention of the voice request analyzed by the NLU device; and
the third-party application is a Natural Language Processing (NLP) device.

6. The semantic processing method according to claim 4, wherein the method further comprises:
registering, by the semantic processing platform, the skill service application to the semantic processing platform, and bonding a semantic intention corresponding to the skill service application with the service triggering interface of the semantic processing platform; and
storing, by the semantic processing platform, the bonding relation between the semantic intention corresponding to the skill service application and the service triggering interface of the semantic processing platform in the database.

7. The semantic processing method according to claim 4, wherein the method further comprises:
registering, by a specific module collaborated with the semantic processing platform, the skill service application to the specific module, and bonding the semantic intention corresponding to the skill service application with the service triggering interface of the semantic processing platform;
transmitting, by the specific module, the bonding relation between the semantic intention corresponding to the skill service application and the service triggering interface of the semantic processing platform to the semantic processing platform; and
storing, by the semantic processing platform, the bonding relation in the database.

8. A semantic processing device, comprising:
a processor;
a storage system; and
one or more programs that are stored in the storage system and are executed by the processor;

wherein the one or more programs comprising a semantic processing platform and at least one third-party application, and wherein the semantic processing platform comprises:
- a database configured to store at least one response corresponding to a variety of current semantic intentions;
- an obtaining unit configured to receive a voice request from a robot;
- a semantic interpretation unit configured to perform a sematic analysis on the voice request to obtain a current sematic intention; and
- a semantic processing unit configured to:
  - determine whether a response matching the current semantic intention is stored in a database;
  - obtain the response matching the current semantic intention from the database, in response to determining that the response matching the current semantic intention is stored in the database;
  - obtain the response matching the current semantic intention by accessing a third-party application corresponding to the current semantic intention, in response to determining that the response matching the current semantic intention is not stored in the database, wherein the third-party application is accessed via an open interface of the third-party application; and
  - transmitting the response matching the current semantic intention to the robot to guide the robot to perform a corresponding action.

9. The semantic processing device according to claim 8, wherein the semantic processing unit is further configured to determine a type of the current semantic intention, wherein the type comprises a conversation intention, a function intention, and a skill service intention.

10. The semantic processing device according to claim 9, wherein the semantic processing platform further comprises:
- a storage unit configured to update the response matching the current semantic intention to the database after the response matching the current semantic intention is obtained by accessing the third-party application corresponding to the current semantic intention, in response to the type of the current semantic intention corresponding to the conversation intention or the function intention.

11. The semantic processing device according to claim 9, wherein the one or more programs further comprises at least one skill service application; and
the semantic processing unit is further configured to:
- determine whether a bonding relation corresponding to the current semantic intention is stored in the database, in response to the type of the current semantic intention corresponding to the skill service intention;
- obtain the response matching the current semantic intention by accessing a skill service application corresponding to the bonding relation via an service triggering interface of the semantic processing platform, in response to determining that the bonding relation corresponding to the current semantic intention is stored in the database, wherein the service triggering interface of the semantic processing platform is bonded with the current semantic intentions; and
- access a new skill application to obtain the response matching the current semantic intention, in response to determining that the bonding relation corresponding to the current semantic intention is not stored in the database.

12. The semantic processing device according to claim 11, wherein the semantic processing platform further comprises:
- a register unit configured to register the at least one skill service application to the semantic processing platform, bond a semantic intention corresponding to a skill service application with the service triggering interface of the semantic processing platform, and store an bonding relation between the semantic intention corresponding to the skill service application and the service triggering interface of the semantic processing platform in the database.

13. The semantic processing device according to claim 11, wherein the one or more programs further comprises a specific module collaborated with the semantic processing platform, and configured to conduct registration process on the skill service application and to manage the skill service application.

14. The semantic processing device according to claim 8, wherein the semantic interpretation unit may connects with a natural language understanding (NLU) device, the semantic interpretation unit is further configured to perform the semantic analysis on the voice request to obtain the current semantic intention via the NLU device, and the third-party application is a Natural Language Processing (NLP) device.

* * * * *